United States Patent [19]

Tight, Jr.

[11] 4,436,566

[45] Mar. 13, 1984

[54] RE-ENTERABLE CLOSURE

[75] Inventor: Dexter C. Tight, Jr., Palo Alto, Calif.

[73] Assignee: Raychem Corporation, Menlo Park, Calif.

[21] Appl. No.: 388,791

[22] Filed: Jun. 15, 1982

[30] Foreign Application Priority Data

Jun. 15, 1981 [GB] United Kingdom ................. 8118362

[51] Int. Cl.³ .................... H01B 13/06; H02G 13/06; B32B 3/02
[52] U.S. Cl. ........................................ 156/56; 156/49; 156/86; 156/248; 174/92; 174/DIG. 8; 174/DIG. 11; 428/36; 428/131; 428/157; 428/192
[58] Field of Search .................. 428/36, 131, 192, 156, 428/157; 174/92, DIG. 8, 11; 156/49, 56, 86, 248

[56] References Cited

U.S. PATENT DOCUMENTS

| 2,027,962 | 1/1936 | Currie | 156/212 |
| 3,086,242 | 4/1963 | Cook et al. | 264/209.1 |
| 3,095,908 | 7/1963 | Plummer | 174/DIG. 11 |
| 3,455,336 | 7/1969 | Ellis | 174/DIG. 11 |
| 3,957,382 | 5/1976 | Gruel, Jr. et al. | 174/DIG. 8 |
| 4,283,239 | 8/1981 | Corke et al. | 174/DIG. 8 |
| 4,366,011 | 12/1982 | Nolf | 156/49 |
| 4,366,201 | 12/1982 | Changani et al. | 156/86 |

FOREIGN PATENT DOCUMENTS

| 1506748 | 4/1978 | United Kingdom |
| 1545571 | 5/1979 | United Kingdom |
| 2057788 | 4/1981 | United Kingdom |

Primary Examiner—William R. Dixon, Jr.
Attorney, Agent, or Firm—Douglas A. Chaikin; Herbert G. Burkard; T. Gene Dillahunty

[57] ABSTRACT

A closure for a telecommunications splice case is provided, which comprises a wraparound sleeve secured for example by a rail and channel closure. Re-entry is achieved by cutting of the old rails and channel and removing a central portion of the sleeve, and shrinking a new sleeve across the butts of the old sleeve. If the new sleeve is to seal properly, there must be no leak path along any gap between the remnants of the old rails. Deformations are provided on the flap of the original sleeve, or at the base of the short rail, to allow adhesive on the inside of the sleeve to fill the area between the rail.

17 Claims, 13 Drawing Figures

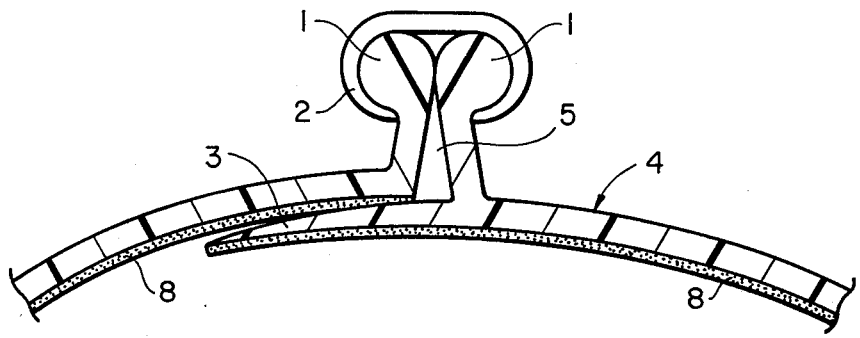
FIG_1
PRIOR ART
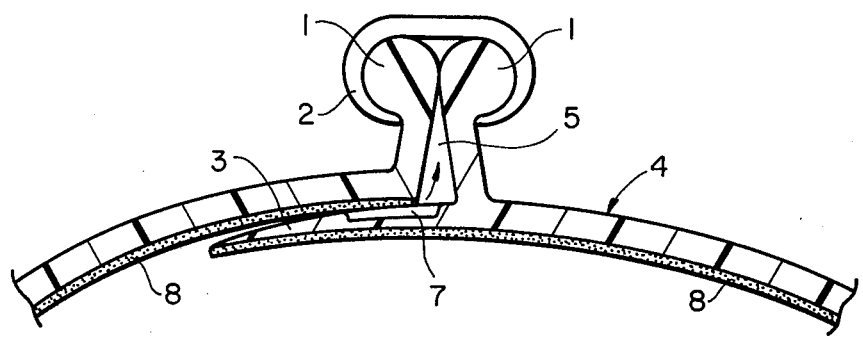
FIG_2a
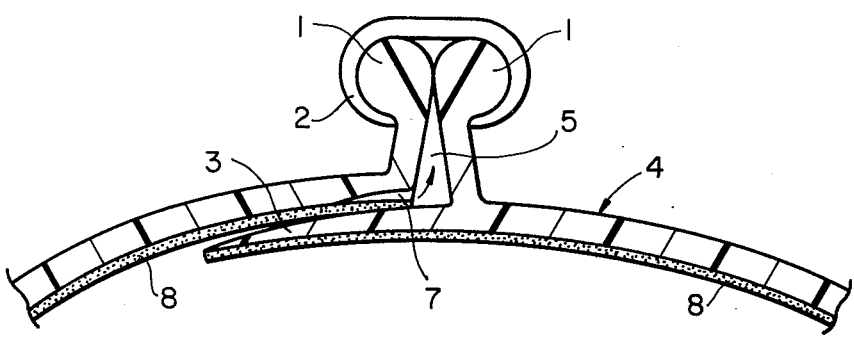
FIG_2b

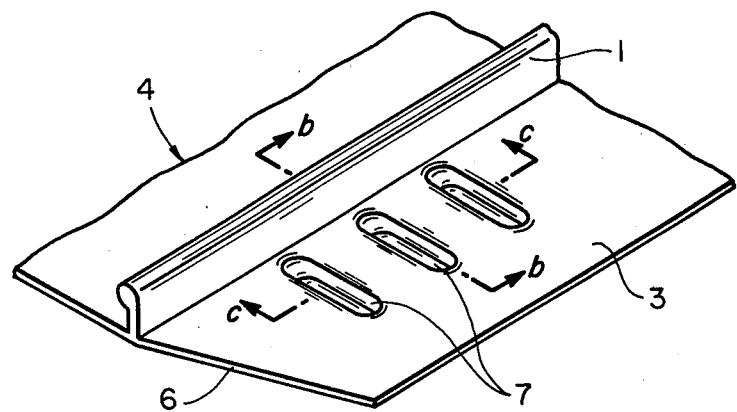
FIG_3a
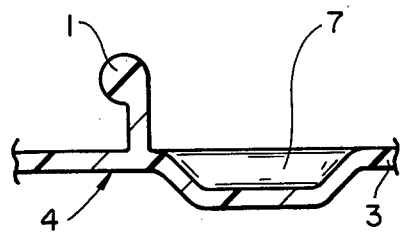
FIG_3b
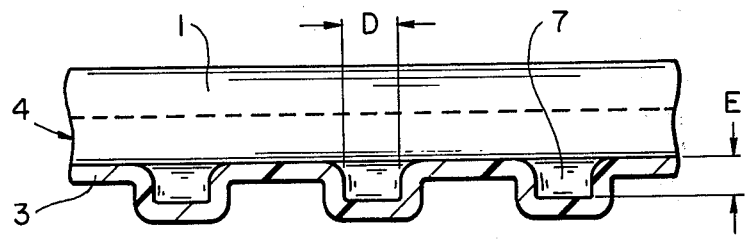
FIG_3c

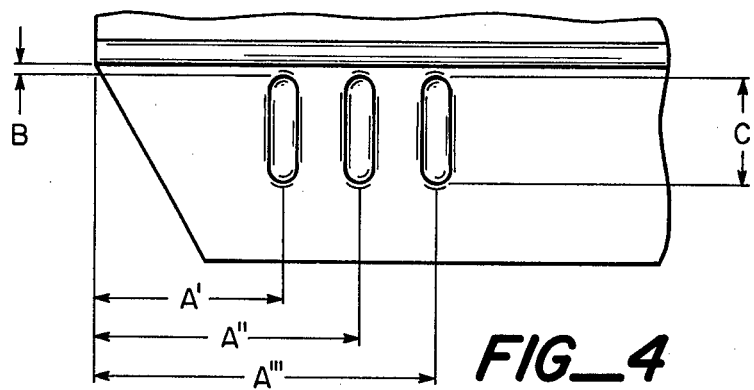
FIG_4
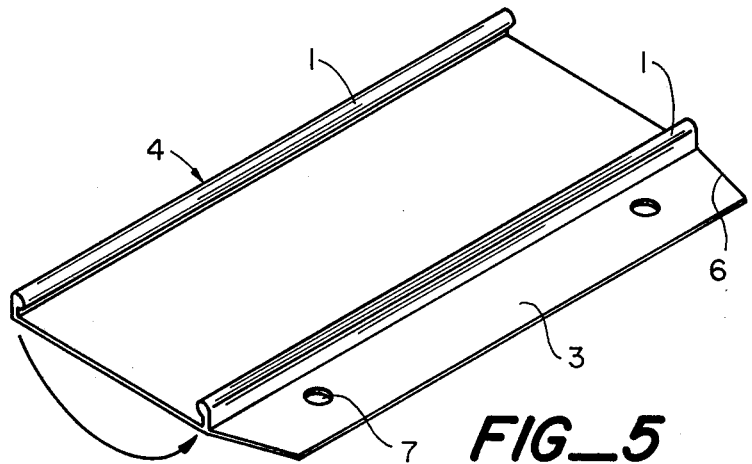
FIG_5
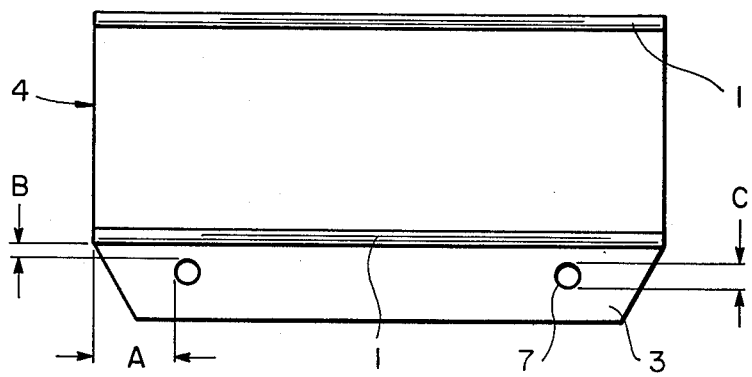
FIG_6

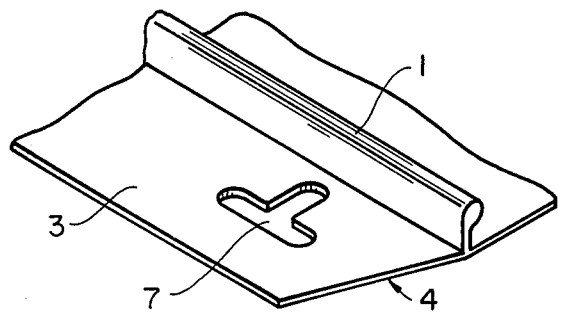
FIG_7a
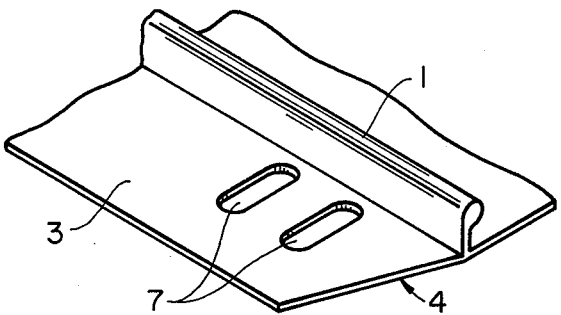
FIG_7b
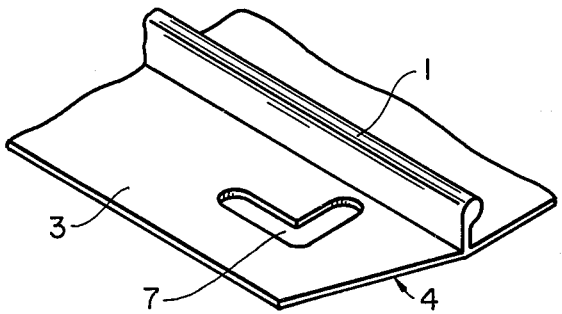
FIG_7c

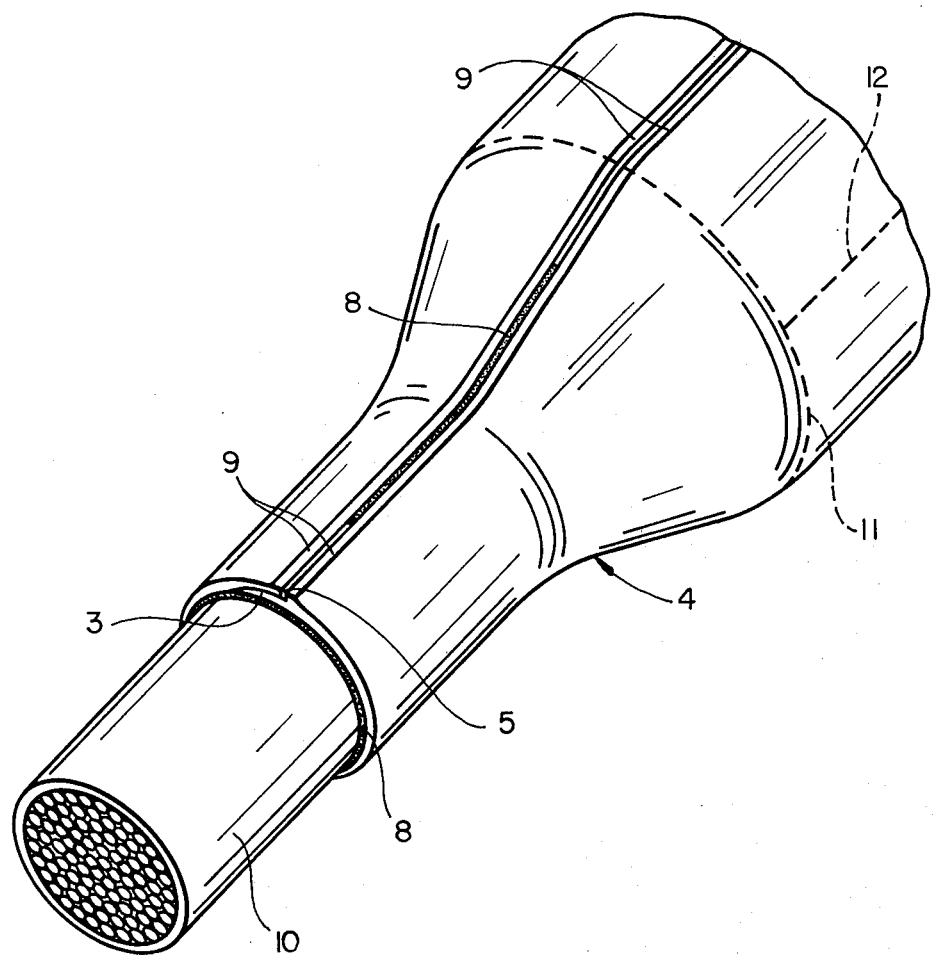
FIG_8

RE-ENTERABLE CLOSURE

This invention relates to an arrangement for providing a closure around an elongate substrate, particularly, though not exclusively a splice between telecommunciations cables.

It is known to use recoverable articles to enclose telecommunications cable splices, and such articles may, for example, comprise a wraparound sleeve at least a portion of which is heat-recoverable, closed by a suitable closure means.

A heat recoverable article is an article the dimensional configuration of which may be made substantially to change when subjected to heat treatment. Usually these articles recover, on heating, towards an original shape from which they have previously been deformed but the term "heat-recoverable", as used herein also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962, 3,086,242 and 3,597,962. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat-stable article is deformed to a dimensionally heat-unstable form in a separate stage.

In the production of heat-recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point, or, for amorphous materials, the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other recoverable articles, as described, for example, in British Pat. No. 1,440,524, an elastomeric member such as an outer tubular member is held in a stretched state by a second member, such as an inner tubular member, which, upon suitable treatment weakens and thus allows the elastomeric member to recover.

A wraparound closure is disclosed in British Pat. No. 1,155,470 which, together with other patent specifications referred to is incorporated herein by reference. In such an enclosure, a wraparound sleeve is formed as an elongate sheet or split tube and then wrapped around the cable. The sleeve has two upstanding rails that may be secured together in abutment by a closure channel, made for example from stainless steel. One of the rails is usually located at one longitudinal edge of the sleeve while the other rail may be spaced from the other edge of the sleeve, the sleeve portion between said other rail and its adjacent sleeve edge forming a longitudinal flap that extends beneath the abutting rails. The flap thereby helps to provide environmental sealing beneath the abutment of the rails. Reference to rails is not intended to specify any particular cross-sectional shape, merely the capability of securement by a channel or clips of the type used in this art.

In some instances it is advantageous to fabricate the sleeve without an integral flap, and accordingly, in another form of wraparound closure arrangement the flap is provided as a discrete sealing member.

A problem to be overcome with closure arrangements employing wraparound sleeves is that of leakage or contamination along the rails after re-entry and re-sealing. During recovery of the original sleeve a tent-shaped void is formed between the rails due to tensions in the sheets. In order to re-enter the sleeve, the rails plus channel are cut off and a centre section of the sleeve removed. A new sleeve is then recovered around the two remaining butts of the old sleeve, and in order to get good sealing the butts must present a closed circumference to the new sleeve; this circumference will, however, be broken by the void between the remnants of the old rails. We have found that this void is best not prior filled with sealant since this makes installation of the channel difficult.

This invention provides a way of overcoming the problem by allowing flow of sealant from within the closed sleeve into the void.

Thus, the invention provides a recoverable polymeric article for use as a wraparound sleeve, having a first upstanding rail adjacent one edge thereof, and a second upstanding rail spaced from another edge such that the portion of material between the second rail and the other edge is a flap which can underline the rails when the sleeve is in use; the sleeve at the base of the first rail or the flap having means which, on recovery of the sleeve, allows passage of sealant on a surface of the sleeve into the region between the first rail, the second rail and the flap. The means referred to will simply prevent a continous seal being made between the sleeve at the base of the first rail and the flap.

The sheet is preferably pre-coated on its side remoted from the rails with the sealant, although sealant can be added on site. Sealant can also be provided on top of the flap, although care should be taken not to make difficult the installation of the channel over the rails. Reference to sealant in this specification includes adhesives, particularly hot-melt adhesives, and mastics. Hot-melt adhesives are, however, preferred.

The invention also provides a closure assembly for covering a substrate comprising; a recoverable article defined above; and closure means which can hold the first and second rails together.

The invention further provides a method of re-entering and re-enclosing a closed wraparound sleeve formed from a recoverable article as defined above, which method comprises; (a) removing the rails from the sleeve; (b) removing a central portion of the sleeve, leaving intact end portions thereof which have between their respective rail butts sealant which has flowed across the flap; (c) enclosing the space between said end portions within a second recoverable sleeve such that the ends of the second sleeve at least overlie said sealant between the butts of the rails; and (d) recovering the second sleeve.

The second recoverable sleeve may or may not be an article of the type of this invention.

The means which allows passage of sealant is preferably one or more depressions or ridges of any suitable shape across the flap towards the second rail, or in the sleeve at the base of the first rail. The depression or ridges preferably are, or define, small craters which are effectively open towards the second rail, but closed towards the distal end of the flap: this allows sealant to flow towards the void but hinders flow in the reverse direction. The depressions or ridges preferably run perpendicular to the second rail, across ⅛ to ¾ of the flap. Alternatively holes may be provided through the flap by punching, or other means, and this can conveniently be carried out in the same operation in which the ends of the flap are tapered. In general one such hole or a series of depressions or grooves will be provided near each end of the sleeve, at the intended transitions in sleeve diameter from the larger centre portion to the smaller end portions which taper down to the diameter of the cable or other substrate. The depressions or ridges can result from the flap or the sleeve at the base of the first rail being formed with an uneven surface which temporarily prevents a perfect seal between the flap and the portion of the sleeve which will overlie it. Ridges could be produced using one or more strips of a higher melting point adhesive across the flap. Depressions and ridges together could be produced by forming the flap in an irregular configuration. In either case, heat recovery of the sleeve could allow sealant to flow into the void under the rails for a period of time before the irregularity was itself destroyed by the heating. Depression or ridges, whether in the flap or rail, are preferred to holes in the flap, since their destruction can mean that the final recovered sleeve is essentially regular, having no features ultimately redundant which could impair the strength or sealing of the sleeve.

The sleeve will generally be supplied coated with a sealant, although in principle this could be applied on site. The most suitable sealant can be selected by the skilled man, and it has been found that sealants previously used for coating recoverable sleeves are satisfactory, no additional properties being required to achieve flow into the void between the flap and the rails. The viscosity must, of course, be chosen to allow suitable flow of sealant at the recovery temperature, and values of $0.5 \times 10^3$ to $80 \times 10^3$ poise at 120° C. and at a sheer rate of $1-10$ sec$^{-1}$ will generally be preferred, $7 \times 10^3$ poise being particularly preferable.

The provision of depressions, ridges or holes in the flap has been found to have remarkable advantages. Firstly, as mentioned already, they fill with suprising efficiency a considerable length of the gap between the rails and the flap, and this is useful for re-entry of the splice case. Secondly holes especially can enhance heat-transfer from the outside of the sleeve to the sealant. This occurs because sealant in the hole sees more directly the radiation applied to cause recovery; this sealant melts and flows causing transfer of heat to the bulk of the sealant within the sleeve. The third advantage is that sealant can be made to appear between the rails and give a visual indication that sufficient heat has been applied to cause proper melting. In this third case the rails may have to be modified in order to allow selective release of molten sealant.

The first of these advantages in particular will now be dealt with in more detail, by way of an explanation of the way in which the void is filled with sealant and by way of an indication of how the filling can be put to good use.

Sealant on the underside of that part of the sleeve that overlies the flap is melted and pumped automatically, on heat recovery of the sleeve, into the void between the rails and the flap. Although this pumping occurs automatically we do not exclude the provision of further pumping means in addition to that which results from recovery of the sleeve. The amount of sealant which passes into the void (and therefore the length of the void that is filled) will depend on the size, shape, number and positioning of the depressions, ridges or holes, as well as the type of sealant, amount of heat applied, technique of shrinkage, and extent of recovery of the sleeve relative to the size of cables it contains. The skilled man would be able to carry out tests by varying each of these parameters independently to determine which set of conditions produced the length of filling that he requires.

As tension develops in the sleeve on recovery, the sleeve overlying the flap is forced against the flap. Although we are not limited to any theory, we believe that pressure begins at the distal edge of the flap and spreads across to the proximal edge. The overlying sleeve, therefore, exerts a rolling action on the flap, or vice versa. This forces sealant across the flap towards the void between the first rail, the second rail and the flap. Also, as recovery takes place the rails are pulled apart at their bases causing the void to enlarge; this may produce a suction which draws the sealant into the void. This flow of sealant does not occur satisfactorily, if at all, in the prior art sleeves, because its passage is blocked by the abutment of the base of the first rail against the flap. What we have done is to prevent this abutment at specific places along the length of the sleeve. One could prevent abutment all along the sleeve, but this is generally unnecessary. We can achieve this in two ways. The first way is to make the flap surface irregular, by means of depressions, ridges of holes, so that the base of the first rail no longer follows exactly the surface of the flap. The second way is to make the sleeve at the base of the first rail irregular. The two ideas could, of course, be combined in the same sleeve.

In general, the sleeve should be provided with two sets of depressions, ridges or holes, one near each transition in sleeve diameter from the large central portion (which covers, e.g., a cable splice) to the smaller diameter cable outlets. At each of these transitions the sleeve is being deformed in two directions, and this buckling may help the sealant to be pumped across the flap. If holes are used and positioned at these regions, no greater effect is produced by the provision of additional holes. Since additional holes could produce points of weakness, the preferred arrangement is two holes only.

It has been surprisingly found that holes in the flap or any depressions or ridges remaining after recovery do not lead to unacceptably short leak paths, and in general no precautions need be taken. In exceptional circumstances when holes are used one could ensure that they were positioned over, say, an aluminum foil sheet of a liner which would then act as a patch which would considerably lengthen any leak path. An alternative is to position the holes further towards the end of the sleeve; this would ensure a long leak path since the seal to the cable occurs at some distance from the end of the sleeve.

For most of the parameters concerning depression, ridge or hole size and position, it has been found that the length of sealant filling reaches a peak at some value of the parameter concerned. However, for sleeves for some smaller diameter cables, the length of filling appears to continue to increase or to be substantially independent of depression, ridge or hole size, Also, the length of filling appears to be independant of the diameter of the central splice portion.

The fact that optimum length of filling occurs when the depressions, ridges or holes are at the transitions in splice diameters, and therefore the region of filling itself occurs over the transitions, is advantageous when the purpose of filling is to aid re-entry of the splice. A splice case is re-entered by cutting away the rails, cutting open the central portion of the splice, and after attending to the contents of the splice, recovering a new sleeve around the remnants of the old splice case. The outlet seals to the cables therefore remains undamaged. If the new sleeve is to seal properly at its ends around the old splice case, the old case must present a smooth and closed circumference to the new sleeve. A gap between the butts of the old rails may become filled with dirt or otherwise provide a leak path under the new sleeve, and it is for this reason that the void between the old rails is desirably filled with sealant on original installation. A length of filling of about 25–30 mm around the cable outlet area will generally be sufficient.

The present invention is applicable to any type of splice case where re-entry is likely to be required, but it is particularly useful in conjunction with other features designed to allow re-entry such as the system disclosed and claimed in our co-pending U.K. Patent Application No. 8,102,391. This earlier application related to a re-enterable closure assembly for covering a substrate, which comprises a recoverable outer sleeve, a moisture barrier foil layer, means for bonding said layer to the internal surface of the sleeve, and a continuous protective liner, the arrangement being such that when assembled said layer overlies the liner but is removable therefrom substantially without disturbing the liner. Said layer is preferably removable due to provision of a second moisture barrier foil layer.

The present invention also provides a re-enterable closure assembly as claimed in our co-pending application Ser. No. 8,102,391, having as its outer sleeve the recoverable article defined above.

The invention will be further illustrated, by way of example, by the accompanying drawings, in which:

FIG. 1: is a transverse cross-section of a sleeve, showing first and second rails held in abutment;

FIG. 2a: is a modification of FIG. 1, depressions being provided in the flap to allow flow of sealant;

FIG. 2b: is a modification of FIG. 1, depressions being provided in the sleeve at the base of the first rail;

FIGS. 3a–c: are various views of a recoverable sleeve having depressions in its flap;

FIG. 4: indicates important dimensions of the sleeve shown in FIGS. 3a–c;

FIG. 5: shows in perspective a recoverable sleeve having holes in its flap;

FIG. 6: indicates important dimensions of the sleeve shown in FIG. 5;

FIGS. 7a–c: shows alternatively shaped holes; and

FIG. 8: is a partial perspective view of a closure assembly, after removal of its rails and channel.

In FIG. 1 a wraparound sleeve (4) has been secured in the closed configuration by means of a channel (2) which holds its rails (1) in abutting relationship. The underside of the sleeve (4) has been coated with a sealant. The thickness of sealant is preferably 0.2–1.2 mm, more preferably 0.6–1.2 mm, about 1 mm being the most preferable at present. The right hand rail (1) as drawn is situated away from the edge of the sleeve in order to provide a flap (3) which underlies the join in the rails.

When the sleeve (4) is recovered, tensions cause the rails to pull away from each other, partly by rotation, to leave a tent shaped void (5). It is this void (5) which is desirably filled with adhesive at the transition region in the completed closure assembly. In the present invention sealant (8) is allowed to flow into the void (5). In the prior art such flow is prevented or hindered by a seal caused by the base of the left hand rail (1) (as drawn) abutting the flap (3). Two principal ways of overcoming this are shown: in FIG. 2a depressions (7) are made in the flap (3), so that sealant can flow in the direction of the arrow; in FIG. 2b grooves are made in the sleeve in the base of the left hand rail.

Before the sheet of recoverable material (4) is wrapped around the substrate it has the appearance of FIGS. 3–7. The flap (3) is shown to have tapered ends (6), the function of which is simply to facilitate the transition in diameter at the ends of the recovered closure assembly. The depressions or holes (7) which allow the passage of adhesive are shown. The underside of the recoverable material shown in FIGS. 3–7 is the surface that would be coated with sealant. In order to wrap the sleeve (4) around a substrate, one longitudinal edge would be bent round as indicated by the arrow in FIG. 5 such that the two rails met. A closure means would then be slid over the rails.

FIGS. 4 and 6 show five dimension, A, B, C, D and E, which are conveniently used to characterise a depression or hole for size and position. Suitable sizes C have been found to be from 3–9, preferably about 7.5 mm. The distance B is preferably 1–2 mm in the case of a depression and preferably zero in the case of a hole. The distance A in the case of a hole is preferably 50–100, more preferably 85 mm. Where a series of depressions is provided as in FIGS. 3 and 4, the values (mm) are preferably A'40–60, A"50–70 and A"'60–80, more preferred values being 50, 60 and 70 respectively. The width of each depression D is preferably 4–8 mm, more preferably 6 mm and the depth E 3–6 mm, more preferably 4–5 mm. The preferred values for these parameters will give a sealant filling length within the void (5) of from 50–100 mm, which is well in excess of the generally preferred minimum of 15–25 cms.

The values of these figures will clearly depend on the size of cable splice and on the number of branch-offs. The figures given can, however, be regarded as typical for a 2 cable telecommunications branch-off, such as that sold under Raychem's Trade Mark XAGA 200.

Where a hole is preferred, its shape is not critical, and FIGS. 7a–c illustrate some alternative shapes:. These may be found desirable if the hole is to be situated close to the sleeve ends in order to reduce any leak path. This should, however, not be necessary in normal splices under normal pressures.

FIG. 8 shows a closure assembly in the first stage of re-entry. The rails and channel have been cut off, leaving exposed the butts (9) of the old rails (1). The figure shows a single cable (10) covered by a sleeve (4), although more than one cable could, of course, emerge from each end of the enclosure. A length of sealant (8) has flowed through the holes in the flap (3) and has become visible between the butts (9) of the rails. This length of sealant is preferably no more than 70 mm from the end of the sleeve. The re-entry operation would be continued by ring cutting the sleeve at the middle of each transition as indicated by the line (11), and by making a longitudinal cut along the line (12). Thus, the middle section of the sleeve would be removed. Removal of this middle section would preferably leave any internal liner intact, and this could be ensured if a liner according to our co-pending U.K. Application No. 8,102,391 had been used. After the workman had attended to the necessary repairs within the enclosure a new outer sleeve would be placed around the remnants of the old sleeve such that the ends of the new sleeve lie directly over or past the sealant (8). When the new sleeve is recovered a good seal with the old sleeve can be expected due to the smooth and clean surface ensured by the presence of the sealant (8) between the butts (9) of the old rails. It is to be noted that the original seal between the old sleeve and the cable has not been disturbed.

What is claimed is:

1. A recoverable polymeric article for use as a wraparound sleeve, having a first upstanding rail adjacent one edge thereof, and a second upstanding rail spaced from another edge such that the portion of material between the second rail and the other edge is a flap which can underlie the rails when the sleeve is in use; the sleeve at the base of the first rail or the flap having means which, on recovery of the sleeve, allows passage of sealant on a surface of the sleeve into a region between the first rail, the second rail and the flap.

2. An article according to claim 1, in which the means which allows passage of sealant is one or more ridges or depressions across the flap, positioned adjacent the second rail.

3. An article according to claim 2, in which the ridges or depressions are present as two sets, respectively at or adjacent opposite end portions of the second rail.

4. An article according to claim 2, in which the ridges or depressions define pathways which are open to passage of sealant towards the proximal edge of the flap and closed to passage of sealant towards the distal edge of the flap.

5. An article according to claim 1, in which the means which allow passage of sealant is at least one deformation in the unrecovered material of the flap, the deformation at least substantially being resolved by recovery of the article.

6. An article according to claim 5, in which the deformation retains its integrity throughout at least most of the radial recovery of the wraparound sleeve.

7. An article according to claim 6, in which the deformation is substantially rectangular in cross-section.

8. An article according to claim 1, being coated on a surface opposite the upstanding rails with a sealant.

9. An article according to claim 1, which is removable by means of heat.

10. An article according to claim 9, being coated on a surface opposite to the upstanding rails with a hot-melt adhesive which flows at a temperature not greater than the recovery temperature of the article.

11. A re-enterable closure assembly for covering a substrate, which comprises a liner which can be placed around the substrate, an article according to claim 1, 8 or 9, and closure means which can hold the first and second rails together.

12. A re-enterable closure assembly for covering a substrate, which comprises an article according to claim 1, 8 or 9, a moisture barrier foil layer, means for bonding said layer to a surface of the article opposite the rails, and a continous protective liner, the arrangement being such that when assembled said layer overlies the liner but is removable therefrom substantially without disturbing the liner.

13. An assembly according to claim 12, in which said layer is removable from the liner due to the provision of a second moisture barrier foil layer.

14. An assembly according to claim 11, being adapted to enclose a cable splice.

15. A method of re-entering and re-enclosing a closed wraparound sleeve formed from an article according to claim 1, 8 or 9, which method comprises:
  (a) removing the rails from the sleeves;
  (b) removing a central portion of the sleeve, leaving intact end portions thereof which have between their respective rail butts sealant which has passed across the flap;
  (c) enclosing the space between said end portions within a second recoverable sleeve such that the ends of the second sleeve at least overlie sealant between the butts of the rails; and
  (d) recovering the second sleeve.

16. An assembly comprising a substrate enclosed by a recovered wraparound sleeve having first and second upstanding rails held in abutting relationship by a closure means, one rail being spaced from an edge of the sleeve, defining a flap which underlies the abutting rails; there being a region between the first rail, the second rail and the flap, said region being filled with a sealant.

17. An assembly according to claim 16, in which the filling with sealant is at two locations respectively at or adjacent opposite end portions of the sleeve.

* * * * *